United States Patent

[15] 3,645,150

Crossland

[45] Feb. 29, 1972

[54] ADJUSTABLE CABLE ASSEMBLY

[72] Inventor: Francis D. Crossland, Ilford, England

[73] Assignee: Ford Motor Company, Dearborn, Mich.

[22] Filed: July 27, 1970

[21] Appl. No.: 58,510

[52] U.S. Cl. ............................................................74/501 P
[51] Int. Cl. ..........................................................F16c 1/22
[58] Field of Search ..............................74/501, 502, 501 P

[56] References Cited

UNITED STATES PATENTS

| | | | |
|---|---|---|---|
| 3,101,821 | 8/1963 | Henry | 74/501 |
| 3,429,197 | 2/1969 | Loewenstern | 74/502 |
| 3,468,187 | 9/1969 | Payerle | 74/502 X |
| 3,262,480 | 7/1966 | Storch | 151/7 |
| 2,424,757 | 7/1947 | Klumpp | 74/501 P |
| 3,443,452 | 5/1969 | Shontz | 74/502 |

FOREIGN PATENTS OR APPLICATIONS

| 443,123 | 2/1936 | Great Britain | 74/501 |

*Primary Examiner*—Milton Kaufman
*Attorney*—John R. Faulkner and Glenn S. Arendsen

[57] ABSTRACT

A motion transmitting cable assembly has a cap member mounted rotatably on one end of the cable sheath. The cap has an external threaded portion and the cable core member passes movably through the cap. A retaining plug having internal threads snaps into a stationary wall and receives the threaded portion of the cap member. Rotating the cap member relative to the retaining plug adjusts the position of the end of the core member.

5 Claims, 3 Drawing Figures

PATENTED FEB 29 1972

3,645,150

INVENTOR
FRANCIS D. CROSSLAND
BY
John R. Faulkner
Glenn S. Arendsen
ATTORNEYS

ADJUSTABLE CABLE ASSEMBLY

SUMMARY OF THE INVENTION

Remote control cable assemblies are being used in increasing numbers as automotive accelerator pedal linkages. Such cable assemblies typically include an external sheath surrounding a relatively movable core member. The ends of the sheath usually are fixed and one end of the core is connected to a control member while the other end is connected to the element that is to be controlled. Adjustments in the rest positions of the controlled element typically had to be made by loosening a clamp holding one end of the sheath, manually moving that end into a new position and retightening the clamp. Such adjustments are laborious and tend to be relatively inaccurate since retightening is necessary before the new position can be evaluated.

This invention provides an adjustable remote control cable assembly that can be adjusted rapidly and accurately. The cable assembly includes a cable having an external sheath surrounding a relatively movable core member. A cap member located at one end of the sheath has a threaded exterior portion and an interior passage through which the core member extends. One end of the cap member preferably is cup shaped to receive the end of the sheath. A plug capable of being inserted into a hole in a stationary plate has a threaded internal bore that threadably engages the threaded exterior portion of the cap member. The plug is retained in the wall against rotational and axial movement. Rotating the cap member relative to the sheath and the plug acts through the screw threads to adjust the axial position of the end of the sheath relative to the stationary plug which thereby adjusts the position of the end of the core.

The screw threads preferably are self-locking, which can be achieved readily by making both the cap and plug out of a relatively hard but deformable polymeric material. A slight interference fit then is designed into the screw threads so that installation of the cap into the plug resiliently deforms the threads of at least one member. Excellent self-locking is achieved by making the cap out of a harder polymeric material than the plug and incompletely forming the screw threads in the plug so that assembly of the cap and the plug tends to complete thread formation.

A plug having a noncircular exterior surface that fits into a similarly shaped hole in the stationary wall prevents rotational movement of the plug during adjustment. A flange on one end of the plug cooperates with resilient barbs permitting plug installation into the stationary wall but springing outward to engage the opposite side of the wall to prevent axial movement of the plug.

Cables of the invention usually are assembled by threadably engaging the plug and cap member before end fittings are attached to the core member. The cable assemblies are installed by snapping the plug into its appropriate hole and then rotating the cap member to adjust the core to its desired position.

DETAILED DESCRIPTION

Figure 1:
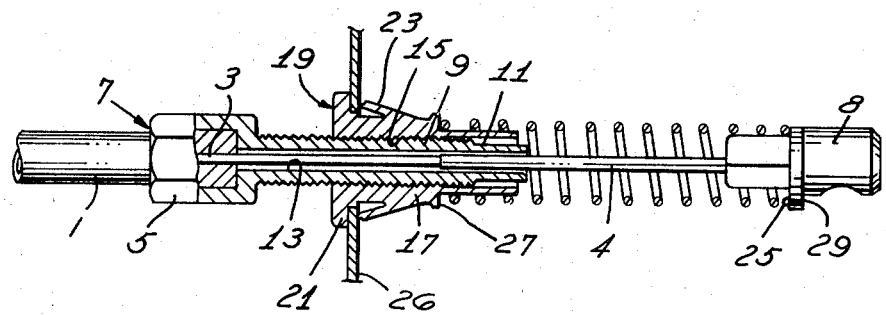
FIG. 1 is a partially sectioned view of one end of the cable showing the relative positions of the cable sheath, cable core, cap and plug.
Figure 2:
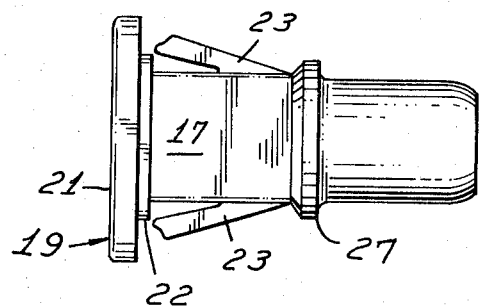
FIGS. 2 and 3 are enlarged views of the plug showing the resilient barbs and square ridge that prevent axial and rotational plug movement.
Figure 3:
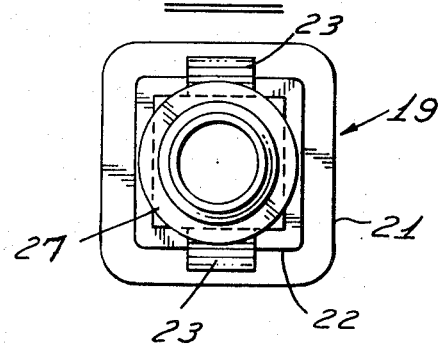

Referring to the drawing, a remote control cable assembly of the push-pull type has a sheath 1 surrounding a relatively movable core 3. A cap member 7 has a cup portion 5 and a barrel portion 11. The cup portion surrounds one end of the sheath and the barrel portion has external screw threads formed thereon. Core member 3 extends through an internal passage 13 in the barrel portion and is connected to a fitting 8 that attaches the core member to a throttle blade for example. A plastic sleeve 4 can be used to stiffen the end of core member 3 if desired.

A plug 19 has a large flange 21 on one end of a projection 17. Projection 17 has a slightly enlarged square ridge 22 located against flange 21. At least two resilient barbs 23 are located on projection 17 and angle acutely back toward flange 21. An enlarged shoulder 27 is formed on the exterior of projection 17 further outward of barbs 23.

Projection 17 of plug 19 is pressed into a square aperture in a stationary plate 26 until flange 19 contacts the plate. The aperture corresponds in size and shape to ridge 22. Barbs 23 deflect as the plug passes through the aperture but then spring back to bear against the inner surface of the plate to prevent axial movement of the plug. Fitting 8 then is attached to the throttle blade and cap member 7 is threaded into plug 19 an appropriate distance, thereby adjusting the location of the fitting.

The exterior of cup portion 5 can have a hexagonal shape so it can be engaged by a wrench. A compressive spring 25 can be positioned between shoulder 27 and a shoulder 29 formed on fitting 8. This spring location is particularly useful for vehicle throttle applications since cable breakage is unlikely to impair the throttle closing ability of the spring. Sleeve 4 preferably extends at least a short distance into passage 13 to prevent kinking of the core member.

Polyamides or any of the common plastics can be used to make cap member 7, plug 19 and sleeve 4. Polyamides are preferred since such materials are available in different hardnesses so that it is relatively easy to obtain caps that are harder than the plugs.

Cables assemblies intended for use as automotive throttle linkages are supplied to the vehicle assembly line with cap member 7 screwed into the plug member 19 the theoretically correct distance. On the assembly line, projection 17 of the plug is pressed through a square hole in the plate until flange 21 contacts one side of the plate and barbs 23 contact the other side as described above. The location of the square ridge in the square aperture prevents rotation of the fastener during any manual rotation of the cap member that is necessary to adjust the position of fitting 8.

Thus the invention provides a remote control cable assembly capable of ready adjustments. The cable assembly is particularly useful as a throttle linkage for automotive vehicles but can be used in other applications with equal advantage.

I claim:

1. An adjustable cable assembly comprising
   a cable having an external sheath surrounding a relatively movable core member,
   a cap member located at one end of said sheath, said cap member having a cup-shaped portion receiving rotatably one end of said sheath, said cap member having a threaded exterior portion and an internal passage, said core member extending movably through the internal passage of the cap member, and
   plug means for insertion in a hole in a stationary wall, said plug means including means to retain said plug means in said wall against both rotational and axial movement after insertion therein, said plug means having a threaded internal bore that threadably engages the threaded exterior portion of said cap member, said cap member being rotatable relative to said cable and said plug means so rotation of said cap member adjusts the position of the end of the core member.

2. The cable assembly of claim 1 comprising a sleeve surrounding the end portion of the core member, said sleeve extending at least partially into the internal passage of the cap member.

3. The cable assembly of claim 2 comprising a fitting means attached to the end of the core member and a compressive spring mounted between said fitting and said plug means, said spring urging said fitting means to an extended position away from said plug means.

4. The cable assembly of claim 1 comprising a fitting means attached to the end of the core member and a compressive spring mounted between said fitting and said plug means, said spring urging said fitting means to an extended position away from said plug means.

5. The cable assembly of claim 1 in which the cap member is made of a harder material than the plug means and the screw threads on the cap member have an interference fit with the screw threads of the plug means.

* * * * *